United States Patent [19]

Henry

[11] Patent Number: 5,717,910
[45] Date of Patent: Feb. 10, 1998

[54] OPERAND COMPARE/RELEASE APPARATUS AND METHOD FOR MICROINSTRUTION SEQUENCES IN A PIPELINE PROCESSOR

[75] Inventor: Glenn Henry, Austin, Tex.

[73] Assignee: Integrated Device Technology, Inc., Santa Clara, Calif.

[21] Appl. No.: 625,625

[22] Filed: Mar. 29, 1996

[51] Int. Cl.$^6$ .................................................. G06F 9/22
[52] U.S. Cl. ........................... 395/568; 395/567; 395/595
[58] Field of Search .................................. 395/387, 395, 395/567, 568, 595, 591, 418, 421.1

[56] References Cited

U.S. PATENT DOCUMENTS

| | | | |
|---|---|---|---|
| 4,240,139 | 12/1980 | Fukuda et al. | 395/421.05 |
| 5,222,244 | 6/1993 | Carbine et al. | 395/800 |
| 5,278,840 | 1/1994 | Cutler et al. | 395/183.01 |
| 5,500,947 | 3/1996 | Uhler et al. | 395/387 |

*Primary Examiner*—Parshotam S. Lall
*Assistant Examiner*—Viet Vu
*Attorney, Agent, or Firm*—James W. Huffman

[57] ABSTRACT

An apparatus and method for improving the execution speed of register generic micro instructions within a pipeline microprocessor is provided. The microprocessor includes descriptor compare logic which monitors references to last used segment registers, and maintains the base address of the last used segment. As holes are created by later register generic micro instructions, the descriptor compare logic compares operands with that of the last accessed segment register. When an operand of the present micro instruction is the same as the last accessed segment register, the descriptor compare logic provides a pipeline release signal which releases the base address associated with the last accessed segment register directly to the following stage in the pipeline, thereby effectively eliminating the register stage of the pipeline, and the associated hole in the pipeline, for the present micro instruction.

43 Claims, 5 Drawing Sheets

| Pipeline flow for Register Fill-in Microinstructions | | | | | | | |
|---|---|---|---|---|---|---|---|
| Cycle | I | X | ROM | R | A | D | W |
| 1 | MOV FS,AX | X | | | | | |
| 2 | | MOV FS,AX | | | | | |
| 3 | | | LOAD X,Y | X | | | |
| 4 | | | LOAD FS,AX | NULL | X | | |
| 5 | | | | LOAD FS,AX | NULL | X | |
| 6 | | | | X | LOAD FS,AX | NULL | X |
| 7 | | | | | X | LOAD FS,AX | NULL |
| 8 | | | | | | X | LOAD FS,AX |
| | | | | | | | X |

| | Pipeline flow for Register Fill-in Microinstructions | | | | | | |
|---|---|---|---|---|---|---|---|
| Cycle | I | X | [ROM] | R | A | D | W |
| 1 | MOV AX,ES:0100h | X | X | X | X | X | X |
| 2 | X | MOV AX,ES:0100h | X | X | X | X | X |
| 3 | X | X | LOAD X,Y | X | X | X | X |
| 4 | X | X | LOAD AX,ES:0100h | NULL | X | X | X |
| 5 | X | X | X | LOAD AX,ES:0100h | NULL | X | X |
| 6 | MOV BX,ES:0102h | X | X | X | LOAD AX,ES:0100h | NULL | X |
| 7 | X | MOV BX,ES:0102h | X | X | X | LOAD AX,ES:0100h | NULL |
| 8 | X | X | LOAD X,Y | NULL | X | X | LOAD AX,ES:0100h |
| 9 | X | X | LOAD BX,ES:0102h | LOAD BX,ES:0102h | X | X | X |
| 10 | X | X | X | X | LOAD BX,ES:0102h | X | X |
| 11 | X | X | X | X | X | LOAD BX,ES:0102h | X |
| 12 | X | X | X | X | X | X | LOAD BX,ES:0102h |

700

OPERAND COMPARE/RELEASE APPARATUS AND METHOD FOR MICROINSTRUTION SEQUENCES IN A PIPELINE PROCESSOR

BACKGROUND

1. Field of the Invention

This invention relates in general to the field of instruction execution in a pipeline processing system, and more particularly to a method and apparatus which fast fills register generic operands with specific values.

2. Description of the Related Art

Modern computer systems utilize a number of different processor architectures to perform program execution. In conventional microprocessor based systems, a computer program is made up of a number of macro instructions that are provided to the microprocessor for execution. The microprocessor decodes each macro instruction into a sequence of micro instructions, i.e., simple machine instructions that the hardware in the microprocessor can understand, and executes all of the micro instructions in the sequence before decoding another macro instruction.

A macro instruction is typically of the form: OPCODE OPERAND1, OPERAND2, where OPCODE specifies the type of operation to be performed, such as add, multiply or nor, and OPERAND1, OPERAND2 specifies the data upon which the operation is to be performed. It should be appreciated that operands 1 and 2 specify data located either in a register within the microprocessor, such as R1, R2, R3, etc., or a location in memory that contains data.

A more specific example of a macro instruction that performs addition on two values, one located in memory [M], and the other located in a register R within the processor, and stores the result in memory, is:

ADD [M],R

This macro instruction is fetched by a microprocessor and provided to a control unit within the microprocessor that translates or decodes the macro instruction into a sequence of micro instructions, or instruction primitives, that the execution unit within the microprocessor understands. The micro instruction sequence generated by the control unit is:

LOAD TEMP,[M]

ADD TEMP,R

STORE [M],TEMP

Since the execution unit of the microprocessor cannot operate directly on data within memory, the microprocessor first loads the data from memory [M] into a temporary register. The microprocessor then adds the contents of the temporary register to the contents in register R. And finally, the microprocessor stores the result of the add back into memory [M].

The control unit within the microprocessor typically includes a control ROM which contains micro instruction sequences, and translate/decode logic which decodes the macro instructions, and addresses the control ROM to provide the appropriate micro instruction sequence for each macro instruction. For the example above, the micro instruction sequence would be stored in the control ROM at a designated address. When the control unit of the microprocessor received a macro instruction of the form indicated above, it would address the control ROM which would, in turn, provide the micro instruction sequence to an execution unit.

As microprocessors became more powerful, their macro instruction sets increased in both size and complexity. Thus the size of the control ROM which contained the micro instruction sequences associated with the macro instructions grew accordingly. However, the growth in size of the control ROM has been exponential rather than linear. As discussed above, for each macro instruction, a sequence of micro instructions is provided in the control ROM. But a single sequence of micro instructions is not capable of handling all variations of a macro instruction. For example, the opcode for the instruction above is ADD. This opcode instructs the execution unit to add two values together, but by itself, does not determine which two values. It is the operands 1 and 2 that specify the values upon which the add function will operate. In a simple instance, a microprocessor may have as many as eight different data registers (R1–R8) upon which the ADD operation might operate, with complex microprocessors having even more. To accommodate all operand permutations for the ADD instruction, at least 56 [n!/(n−k)!] different micro instruction sequences would need to be provided for in the control ROM. And, this does not include any operands which specify memory locations for the data. Thus, if the control ROM were to provide operand specific micro instruction sequences for each macro instruction, and for all combination of operands, the size of the control ROM would be enormous.

To overcome this problem, register generic micro instruction sequences are often provided by the control ROM. For the above ADD [M],R macro instruction, the control ROM would provide the following micro instruction sequence:

LOAD TEMP,X

ADD TEMP,Y

STORE X,TEMP where X and Y do not specify any particular operand. The control ROM provides these micro instructions, one at a time, to the translate/decode logic. The translate/decode logic takes these register generic micro instructions, and fills in the appropriate operands specified by the macro instruction. By allowing the translate/decode logic to fill in register generic operands, the size and complexity of the control ROM is dramatically reduced. However, with the advantage of decreased size and complexity of the control ROM comes the disadvantage of decreased performance. Now, the control unit not only has to look up the appropriate micro instruction sequence for each macro instruction, but in addition, has to fill in appropriate operands for each micro instruction. This fill in process requires additional processor time, which means that execution of the micro instruction sequence is delayed.

In more advanced computer systems, another type of microprocessor, called a "pipeline" processor, is used. A pipeline processor decodes macro instructions, similar to those of the conventional microprocessor discussed above, into a sequence of micro instructions. However, the micro instructions are overlapped during execution to improve performance. Such overlapping of micro instructions during execution is known as "pipelining". Pipelining is a key implementation technique used to make fast microprocessors.

A pipeline is like an assembly line. Each step in a pipeline operates in parallel with other steps, though on a different micro instruction. Like the assembly line, different steps are completing different parts of a macro instruction in parallel. Each of these steps is called a pipe stage or a pipe segment. The stages are connected one to the next to form a pipe-instructions enter at one end, progress through the stages, and exit at the other end.

Flow of instructions through a pipeline is typically controlled by a system clock, or processor clock signal. For example, during a first clock cycle, a first macro instruction may be fetched from memory. By the end of the clock cycle, the first macro instruction is placed into a buffer which feeds a translate/decode stage. During a second clock cycle, a second macro instruction may be fetched and placed into the buffer. In addition, and in parallel to the second macro instruction fetch, the first macro instruction is "read" by the translate/decode logic, and translated into a sequence of micro instructions. By the end of the second clock cycle, a first micro instruction in the sequence is provided to the instruction register. During a third clock cycle, the first micro instruction is provided to later stages in the pipeline, and a second micro instruction is stored in the instruction register. This pipeline process continues indefinitely as long as macro instructions can be fetched into the buffer during each clock cycle, and as long as the translate/decode logic can provide micro instructions to later stages in the pipeline during each clock cycle.

If we apply the idea of providing register generic micro instructions to a pipeline processor, the result is as follows. During a first clock cycle, a first macro instruction may be fetched from memory. By the end of the clock cycle, the first macro instruction is placed into a buffer which feeds a translate/decode stage. During a second clock cycle, a second macro instruction may be fetched and placed into the buffer. In addition, and in parallel to the second macro instruction fetch, the first macro instruction is "read" by the translate/decode logic, and the control ROM is addressed to provide the appropriate micro instruction sequence. During a third clock cycle, a first micro instruction in the sequence is provided to the instruction register by the control ROM. In this case, however, the micro instruction that is provided, is register generic, i.e., it does not specify any particular operands. During a fourth clock cycle, the translate/decode logic must fill in the specific operands designated by the macro instruction. During a fifth cycle, the first micro instruction is provided to later stages in the pipeline, and a second micro instruction is stored in the instruction register. However, this micro instruction also needs to be filled in with register specific operands.

Thus, each time a register generic micro instruction is provided by the control ROM to the instruction register, translate/decode logic is required to fill in register specific operands. In pipeline processors, such register specific fill in of control ROM generated micro instructions requires at least one clock cycle per micro instruction. Such additional processing requirement adds delays or holes in the pipeline. And, every delay or hole in the pipeline increases the time required to execute the micro instruction sequence. Processor performance is effected accordingly.

SUMMARY

For the foregoing reasons, there is a need for an apparatus and method which fast fills operands in register generic micro instructions, and which improves the efficiency in calculating the effective address for such register generic micro instructions within a pipeline microprocessor.

To address the above-detailed deficiencies, it is an object of the present invention to overcome delays associated with filling in specific operands in register generic micro instructions.

It is therefore a feature of the present invention to provide a pipeline processing system, for executing macro instructions. The pipeline processing system includes: memory, for storing addressable data; an instruction cache, for storing the macro instructions; and a control unit, connected to the instruction cache, for retrieving the macro instructions from the instruction cache, and for translating each of the macro instructions into a plurality of associated micro instructions, the plurality of associated micro instructions having operands. The control unit includes: a control ROM, for storing a plurality of register generic micro instruction sequences; and a translator, connected to the control ROM, for selecting particular ones of the plurality of register generic micro instruction sequences, and for converting the particular ones of the plurality of register generic micro instruction sequences into the plurality of associated micro instructions for each of the plurality of macro instructions. The pipeline processing system also includes: an instruction register, connected to the translator, for storing the plurality of associated micro instructions, for execution in later stages in the pipeline processor system; a register file, connected to the instruction register, addressable by the operands, for temporarily storing register data which may be operated upon by the plurality of associated micro instructions; and descriptor compare logic, connected to the instruction register, and to the register file, for latching a first operand, associated with a first micro instruction, and for comparing the first operand with a second operand, which is provided by the translator, wherein the descriptor compare logic causes the pipeline processing system to halt for at least one clock cycle when the first operand and the second operand are not the same.

Another feature of the present invention is to provide the pipeline processing system as mentioned above wherein the register generic micro instruction sequences include machine level instruction primitives which do not have operands that refer to specific registers within the register file.

An additional feature of the present invention is to provide the pipeline processing system as mentioned above wherein the ones of the plurality of register generic micro instruction sequences are selected by the translator to correspond to each of the macro instructions.

A further feature of the present invention is to provide the pipeline processing system as mentioned above wherein the translator converts the ones of the plurality of register generic micro instruction sequences into the plurality of associated micro instructions for each of the plurality of macro instructions by specifying particular registers for the plurality of register generic micro instruction sequences.

Yet another feature of the present invention is to provide the pipeline processing system as mentioned above wherein the specified particular registers refer to registers within the register file which temporarily store the register data which may be operated upon by the plurality of associated micro instructions.

An additional feature of the present invention is to provide the pipeline processing system as mentioned above wherein the register file includes: data registers, for storing the register data which may be operated upon by the plurality of associated micro instructions; and segment registers, which provide address information pointing to the addressable data stored in the memory.

A further feature of the present invention is to provide the pipeline processing system as mentioned above wherein the segment registers include: selector registers, for storing indices to a plurality of base address locations; and descriptor registers, associated with the selector registers, for storing the base address locations.

Yet another feature of the present invention is to provide the pipeline processing system as mentioned above wherein the operands reference the indices stored in the selector registers, which point to the descriptor registers.

A further feature of the present invention is to provide the pipeline processing system as mentioned above wherein when the operands reference the indices, the operands use the base address locations in the descriptor registers to calculate effective addresses in the memory for the addressable data.

An additional feature of the present invention is to provide the pipeline processing system as mentioned above wherein the base address locations are used by later stages in the pipeline processing system to calculate effective addresses for the addressable data in the memory.

Another feature of the present invention is to provide the pipeline processing system as mentioned above wherein when the first operand references an indicium stored in one of the selector registers, and the second operand references the same indicium stored in one of the selector registers, the descriptor compare logic does not halt the pipeline processing system.

A further feature of the present invention is to provide the pipeline processing system as mentioned above wherein the first operand utilizes a first base address to calculate a first effective address for the first operand, and the second operand also utilizes the first base address to calculate a second effective address for the second operand.

An additional feature of the present invention is to provide the pipeline processing system as mentioned above wherein the first base address is used by later stages in the pipeline processing system to calculate the second effective address for the second operand.

A further feature of the present invention is to provide the pipeline processing system as mentioned above wherein the first base address is provided to the later stages in the pipeline processing system, without any clock delays, to calculate the second effective address for the second operand.

By utilizing the base address associated with the first operand to calculate an effective address for the second operand, the base address associated with the second operand does not have to be retrieved. Eliminating the retrieval of this base address improves the execution of such register generic micro instructions by at least one clock cycle.

Another aspect of the present invention is to provide a pipeline microprocessor, within a computer system having a memory for storing addressable data and an instruction cache for storing macro instructions, the pipeline microprocessor having multiple pipeline stages including a register stage, for executing micro instructions. The pipeline microprocessor includes a control unit, connected to the instruction cache, for retrieving the macro instructions from the instruction cache, and for translating each of the macro instructions into a plurality of micro instructions which are associated therewith, the plurality of associated micro instructions having operands, the operands specifying addressable data upon which the associated micro instructions operate. The control unit includes: a control ROM, for storing a plurality of micro instruction sequences which do not specify addressable data upon which the plurality of micro instruction sequences operate; and a translator, connected to the control ROM, for selecting ones of the plurality of micro instruction sequences which are associated with each of the macro instructions, and for providing to the ones of the plurality of micro instruction sequences, the operands which specify addressable data upon which the ones of said plurality of micro instruction sequences operate. The pipeline microprocessor also includes an instruction register, connected to the control unit, for storing the plurality of associated micro instructions, and for providing the plurality of associated micro instructions to later stages in the pipeline microprocessor; and a register file, connected to the instruction register. The register file includes: addressable data registers, for storing data upon which the plurality of micro instruction sequences operate; and segment registers, for storing base addresses of segments in the memory which contain data upon which the plurality of micro instruction sequences operate, wherein the operands indicate either of the addressable data registers, or the segment registers to specify the addressable data upon which the associated micro instructions operate. The pipeline microprocessor further includes descriptor compare logic, connected to the instruction register, and to the register file, for latching a first operand, associated with a first micro instruction, which indicates one of the segment registers which specifies addressable data by providing a first base address, and for comparing the first operand with a second operand which is associated with a second micro instruction, whereby when the second operand also indicates the one of said segment registers which specifies addressable data by providing the first base address, the descriptor logic releases the register stage in the pipeline processor thereby providing the first base address to later stages in the pipeline.

Another feature of the present invention is to provide the pipeline microprocessor as mentioned above wherein the operands specify either addressable data registers which contain the data upon which the plurality of associated micro instructions operate; segment registers, which store the base addresses of segments in the memory which contain the data upon which the plurality of associated micro instructions operate; or immediate data, upon which the plurality of associated micro instructions operate directly.

An additional feature of the present invention is to provide the pipeline microprocessor as mentioned above wherein the plurality of micro instruction sequences which do not specify addressable data comprise machine level instruction primitives which do not have operands that refer to either the specific addressable data registers or the segment registers within the register file.

A further feature of the present invention is to provide the pipeline microprocessor as mentioned above wherein the translator provides an address to the control ROM which references the select ones of the plurality of micro instruction sequences appropriate for each of the macro instructions.

Another feature of the present invention is to provide the pipeline microprocessor as mentioned above wherein the select ones of the plurality of micro instruction sequences are provided by the control unit, one at a time, to the instruction register.

Yet another feature of the present invention is to provide the pipeline microprocessor as mentioned above wherein the select ones of the plurality of micro instructions sequences are first provided to the instruction register by the control ROM without specifying addressable data upon which the plurality of micro instruction sequences operate.

An additional feature of the present invention is to provide the pipeline microprocessor as mentioned above wherein the translator provides to the instruction register the operands which specify addressable data upon which the ones of said plurality of micro instruction sequences operate, for each of the plurality of micro instruction sequences which do not specify addressable data.

Another feature of the present invention is to provide the pipeline microprocessor as mentioned above wherein the instruction register, if it contains one of the plurality of associated micro instructions, and if the one of the plurality of associated micro instructions contains the operands which specify addressable data upon which the ones of the plurality of micro instruction sequences operate, the instruction register will provide the one of the plurality of associated micro instructions to a later stage in the pipeline.

A further feature of the present invention is to provide the pipeline microprocessor as mentioned above wherein the instruction register, if it contains one of the plurality of associated micro instructions, and if the one of the plurality of associated micro instructions does not contain the operands which specify addressable data upon which the ones of the plurality of micro instruction sequences operate, the instruction register will not provide the one of the plurality of associated micro instructions to a later stage in the pipeline, causing the pipeline to stall for at least one clock cycle.

Another feature of the present invention is to provide the pipeline microprocessor as mentioned above wherein the segment registers include: selector registers, which are addressable by the operands, and which contain selectors which point to descriptors; and descriptor registers, associated with the selector registers, which contain the descriptors.

Yet another feature of the present invention is to provide the pipeline microprocessor as mentioned above wherein the descriptors contain the base addresses of segments in the memory which contain data upon which the plurality of micro instruction sequences operate.

A further feature of the present invention is to provide the pipeline microprocessor as mentioned above wherein the descriptor compare logic includes: a register latch, connected to the instruction register, for latching the operands; a descriptor compare circuit, connected to the instruction register, and to the register latch, for comparing a first operand latched by the register latch, to a second operand within the instruction register; and a release cycle signal, connected to the descriptor compare circuit, for indicating when the first operand and the second operand are the same.

Another feature of the present invention is to provide the pipeline microprocessor as mentioned above wherein when the release cycle signal indicates that the first operand and the second operand are the same, the register stage of the pipeline releases a last used base address.

Yet another feature of the present invention is to provide the pipeline microprocessor as mentioned above wherein the last used base address is an address used to calculate an effective address of a memory location within the memory, pointed to by the first operand.

An additional aspect of the present invention is to provide a method for improving the execution speed of a pipeline processor having multiple stages which execute micro instructions that operate on data, the data specified by operands within the micro instructions, wherein the micro instructions are stored within a control ROM with register generic operands, provided by the control ROM to an instruction register, and later filled in with register specific operands by a translator. The method includes: loading a first operand associated with a first micro instruction into a latch; comparing a second operand associated with a second micro instruction with the latched first operand; and if the second operand has the same value as the first operand, generating a pipeline release signal to allow the stages of the pipeline processor to continue.

Another feature of the present invention is to provide the method for improving the execution speed of a pipeline processor as mentioned above, wherein the first and second operands are used by the pipeline processor to determine addresses within a memory where data is stored.

A further feature of the present invention is to provide the method for improving the execution speed of a pipeline processor as mentioned above, wherein the data is operated upon by the first and second micro instructions. And, when the second operand has the same value as the first operand, a descriptor base address associated with the first operand is used to calculate an address in the memory for the data associated with the second operand. Furthermore, when the first and the second operands do not have the same value, the step of comparing does not allow the stages of the pipeline processor to continue, because the pipeline processor must calculate an effective address using the second operand to obtain data to be operated upon by the second micro instruction. And the calculation of the effective address using the second operand requires a stall in the pipeline processor.

Additional objects, features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

These and other objects, features, and advantages of the present invention will become better understood with regard to the following description, and accompanying drawings where.

DETAILED DESCRIPTION

Figure 1:
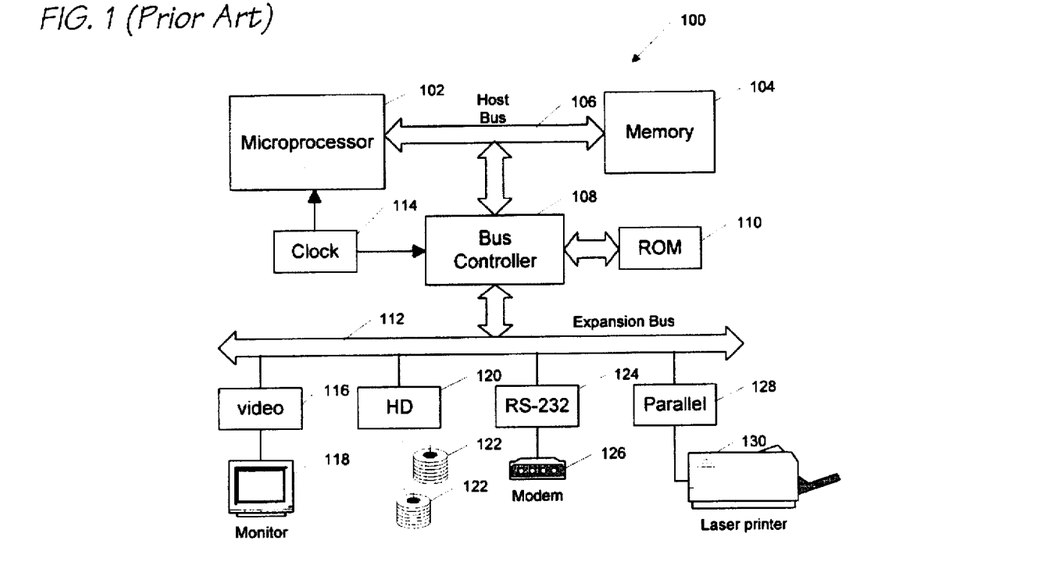
FIG. 1 is a prior art block diagram of a computer system which can incorporate a processor according to the present invention.

Referring to FIG. 1, a block diagram of a typical computer system 100 is shown. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 110, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes macro instructions retrieved from either the memory 104, the ROM 110 or the hard disks 122. The microprocessor can retrieve data from or store data to the memory 104 or the hard disks 122. In addition, the microprocessor can send data to either the modem 126 or the printer 130. A user interface to the microprocessor is provided by the monitor 118. The computer system 100 is typical of the type of computing system environment into which a pipeline processor according to the present invention may be used.

Figure 2:
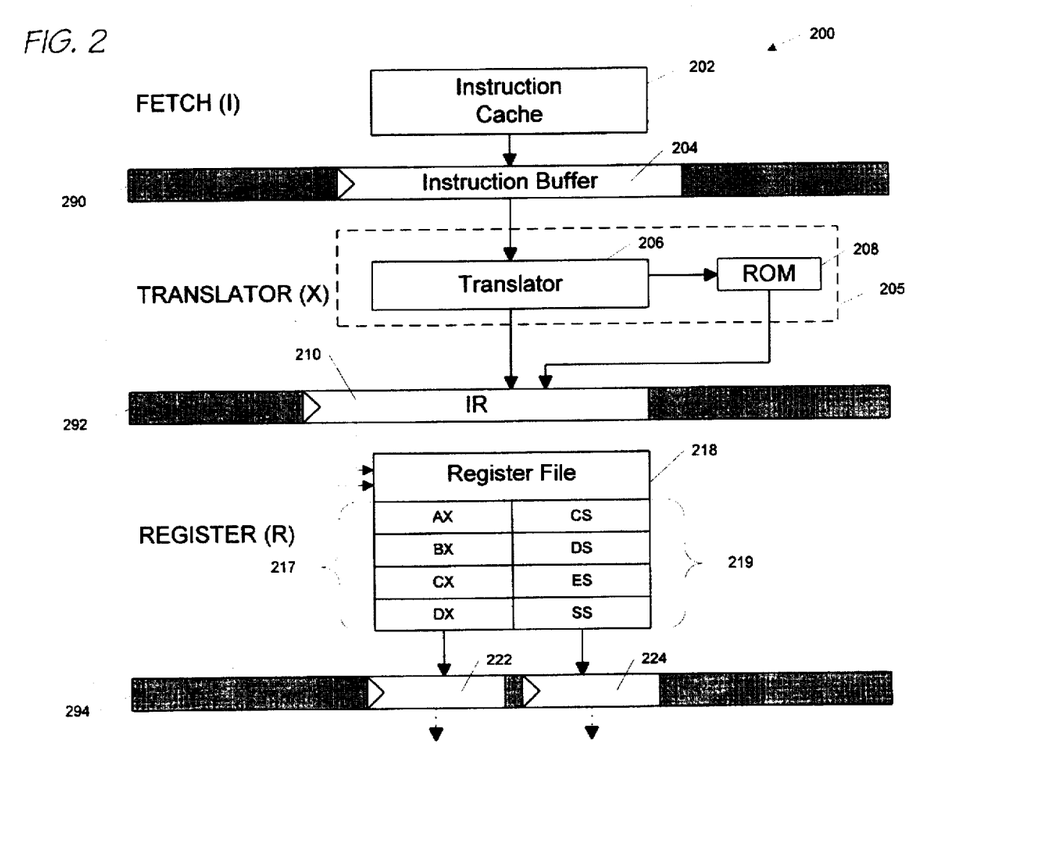
FIG. 2 is a portion of a pipeline microprocessor illustrating a control unit and a register file.

Referring to FIG. 2, a block diagram of a portion of a pipeline processor 200 which may incorporate the present invention is provided. For ease of illustration, three stages in a pipeline processor are shown, separated by buffers 290, 292 and 294. The buffers 290-294 are used to temporarily store data which is transferred from stage to stage in the processor 200. The stages of the pipeline which are shown include: FETCH(I) which is responsible for retrieving macro instructions; TRANSLATOR(X) which is responsible for translating the macro instructions into a sequence of micro instructions; and REGISTER(R) which is responsible for accessing operands upon which the micro instructions will operate.

The pipeline processor 200 includes an instruction cache 202 for storing macro instructions, and for providing the macro instructions to an instruction buffer 204. One skilled in the art will appreciate that the instruction cache 202 may be either a high speed cache within the processor 200, a cache which is external to the processor 200, or even temporary or permanent memory external to the processor 200. The instruction buffer 204 provides temporary storage for the macro instructions until needed by the TRANSLATOR stage of the pipeline.

The pipeline processor 200 also includes a control unit 205 which is responsible for translating/decoding the macro instructions in the instruction buffer 204 into a sequence of micro instructions. The control unit 205 includes a translator 206 connected to a control ROM 208. The translator 206 retrieves a macro instruction from the instruction buffer 204 and determines which micro instruction sequence is associated with the macro instruction. The translator 206 addresses the associated micro instruction sequence in the control ROM 208 which provides the micro instructions in the sequence, one at a time, to the instruction register 210. In one embodiment of the present invention, the translator 206 is capable of either producing micro instructions directly, or of accessing the control ROM 208 which produces the micro instructions. Therefore, a mux (not shown) is provided between the outputs of the translator 206 and the control ROM 208, and the input to the instruction register 210, to select the appropriate source for the micro instructions.

The processor 200 further includes a register file 218 which is connected to the instruction register 210. The register file 216 retrieves operand information, contained within the micro instructions, from the instruction register 210, and provides data specified by the operands to register buffers 222, 224. Data in the register buffers 222, 224 is operated upon by later stages in the pipeline processor 200 (not shown).

In one embodiment of the present invention, the register file 218 includes a set of general purpose registers 217 which may be used to temporarily hold data, and a set of segment registers 219 which may be used to temporarily hold pointers or indices to data stored in memory.

Figure 3:
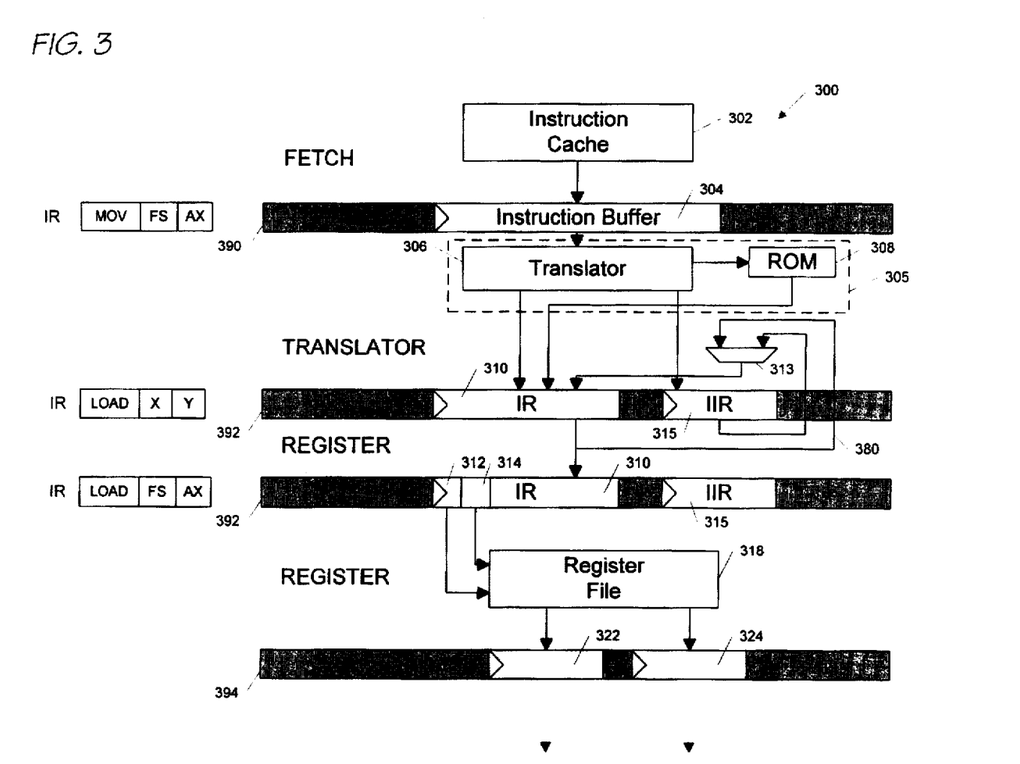
FIG. 3 is a portion of a pipeline microprocessor illustrating operand fill in of register generic micro instructions.

Referring to FIG. 3 the portion of the pipeline processor 200 discussed with reference to FIG. 2 is shown. However, in FIG. 3, the pipeline sequence for a register generic micro instruction is provided. Like numerals refer to like elements, however the prefix 3 replaces the prefix 2 in the hundreds digit. In addition, the contents of the instruction buffer 304 and the instruction register 310 are shown to the left of the processor 300 as the instruction sequence proceeds through the pipeline. Also shown are operand locations 312, 314 within the instruction register 310 which hold operands associated with micro instructions stored in the instruction register 310. An instruction indirection register (IIR) 315 is shown connected to the translator 306. The IIR 315 is responsible for holding operands provided by the translator 306 which are associated with the macro instructions. A forward bus 380 is provided from the instruction register 310 to the input of the mux 313. Also connected to the mux 313 is the output of the IIR 315. The mux 313 allows the contents of the instruction register 310 to be filled in with specific operands stored in the IIR 315.

Figure 4:
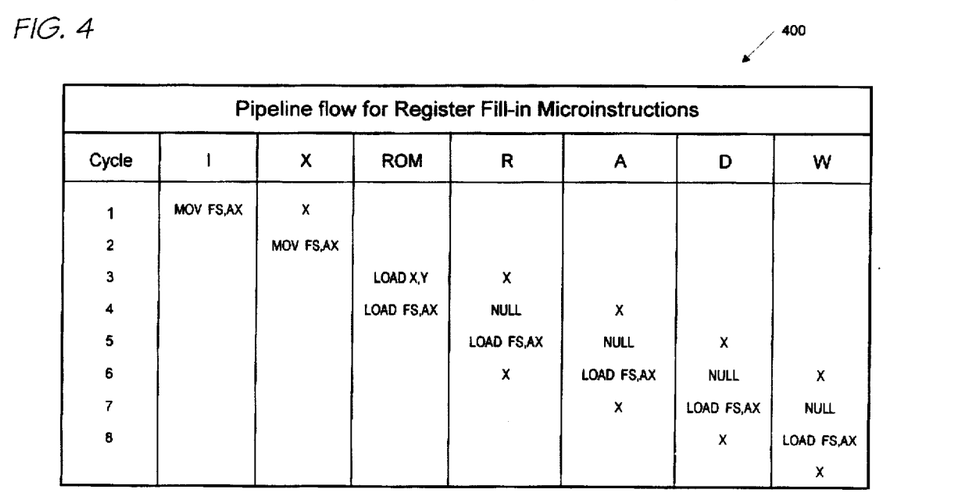
FIG. 4 is a table illustrating micro instruction flow through a pipeline microprocessor.

Referring to FIG. 4, a pipeline table 400 is provided which illustrates an execution sequence for a register generic micro instruction through the pipeline processor 300 of FIG. 3. On the left of the table 400 are listed processor clock cycles 1 through 8. Across the top of the table 400 are listed pipeline stages I, X, ROM, R, A, D and W for the processor 300. Although not shown in FIG. 3, the pipeline stages A, D and W are shown. These stages will be discussed below with reference to FIGS. 5 and 6.

Attention is directed to FIGS. 3 and 4. In operation, during a first clock cycle an illustrative macro instruction MOV FS,AX is fetched from the instruction cache 302 and placed into the instruction buffer 304. The macro instruction moves the contents of register AX into segment register FS within the register file 318.

During a second clock cycle, the macro instruction is read by the control unit 305. The translator 306 within the control unit 305 decodes the macro instruction and determines which micro instruction sequence is appropriate for the macro instruction.

During a third clock cycle, the control ROM 308 is addressed by the translator 306, and provides to the instruction register the first micro instruction in the sequence that is associated with the macro instruction MOV FS,AX 310. In this instance, the associated micro instruction sequence is singular. The micro instruction that is provided to the instruction register 310 is register generic, in the form LOAD X,Y.

The TRANSLATOR stage of the pipeline effectively stalls at this point. During the fourth clock cycle, rather than providing a register specific micro instruction to the register stage of the processor 300, the instruction register 310 must be filled in with the specific operands associated with the macro instruction. One familiar with pipeline processing techniques will recognize that if the instruction register is not able to provide a register specific operand during each processor clock cycle, a "hole" will be created in the pipeline. And, every hole in the pipeline creates delays in instruction processing. During clock cycle two, the translator extracted the register specific operands from the macro instruction and placed the operands into the IIR 315. These operands are maintained in the IIR 315 until the next macro instruction is decoded by the translator 306. Thus, at the end of clock cycle three, the specific operands applicable to the macro instruction MOV FS,AX are available in the IIR 315. During clock cycle four, the register generic micro instruction in the instruction register 310, and the contents of the IIR 315 are muxed together by mux 313. The output of mux 313 is provided to the instruction register 310 at the end of clock cycle four. The instruction register 310 now contains the register specific micro instruction LOAD FS,AX.

During clock cycle five, the operands in locations 312, 314 are provided to the register file 318. The register file 318 accesses the contents of register AX and segment register FS. The contents of these registers are provided to register buffers 322 and 324 for later use in the pipeline. As shown in FIG. 4, the micro instruction LOAD FS,AX proceeds down the following stages of the pipeline until complete. Also shown is the hole indicated by NULL, which follows the LOAD FS,AX micro instruction through the pipeline.

What should be clear at this point is that when register generic micro instructions are provided from the control ROM 308, and later filled in with specific operands from the IIR 315, holes or delays are created in the pipeline processor 300.

Figure 5:
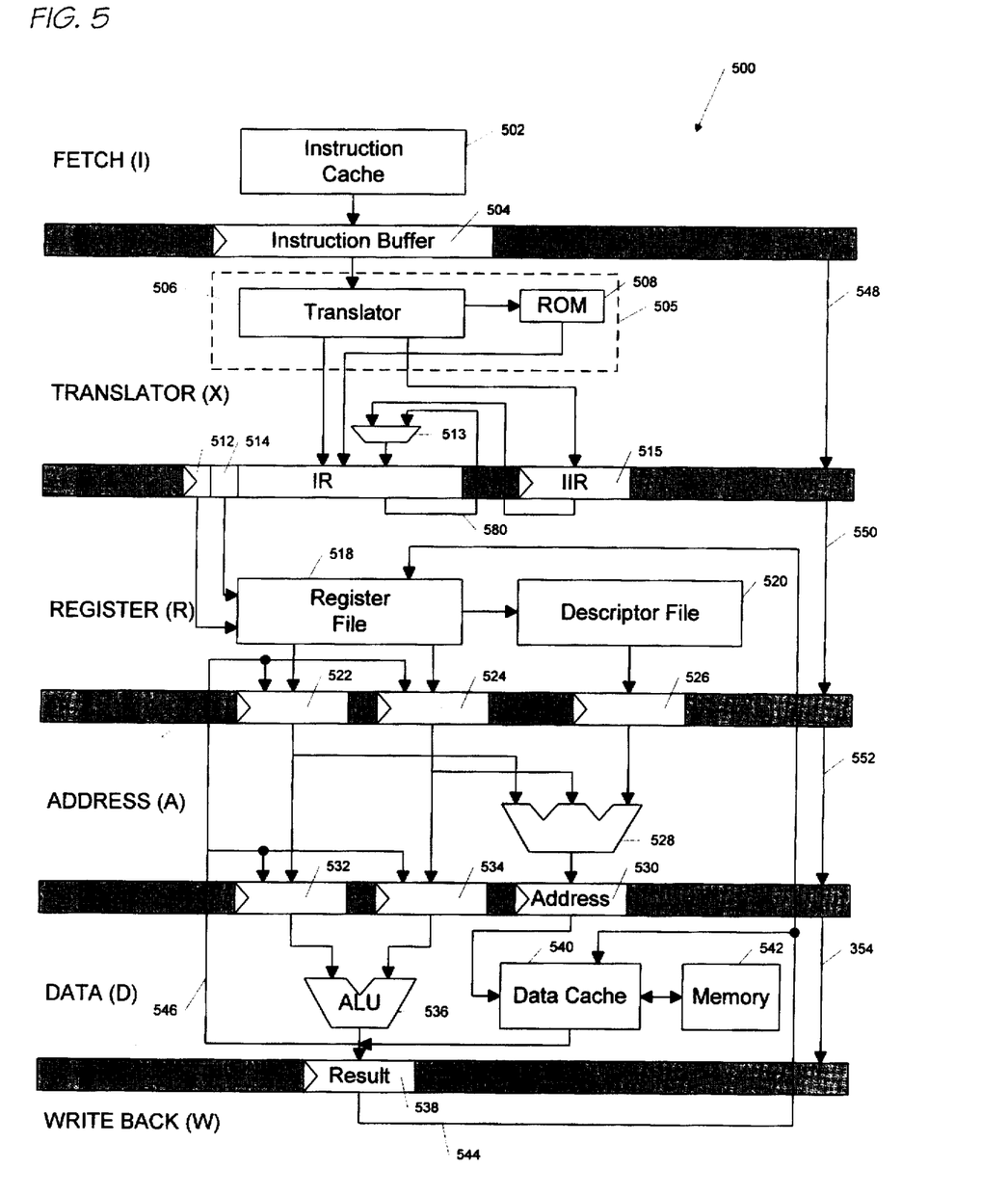
FIG. 5 is a pipeline microprocessor for incorporating the present invention.

Now referring to FIG. 5, a block diagram of a pipeline processor 500 which may incorporate the present invention is shown. Like numerals refer to like elements except that the prefix 5 replaces prefixes 2 and 3 in the hundreds digit. The processor 500 has a six stage pipeline, with the stages corresponding to those discussed above with reference to FIGS. 3 and 4. During the fetch stage, the processor 500 sends out a value in the program counter (not shown) to fetch the next macro instruction from an instruction cache 502 and places the macro instruction into an instruction buffer 504. The instruction buffer 504 holds the macro instruction that will be needed in subsequent clock cycles. Other buffers, registers, etc. may be placed between the fetch stage and the translate/decode stage, or between other stages in the processor 500, as required. However, for ease of illustration, only specific buffer and registers have been shown.

The translate/decode stage reads the macro instruction located in the instruction buffer 504 into the control unit 505. The translator 506 within the control unit 505 determines which micro instruction sequence within the control ROM 508 is associated with the macro instruction. The translator 506 addresses the control ROM 508 to provide the associated micro instruction sequence. The control ROM 508 then provides the micro instructions, one at a time, to an instruction register 510. Additionally, the translator 506 provides register specific operands to an IIR 515 which are later muxed in with register generic micro instructions, and placed into the instruction register 510.

The instruction register 510 contains a number of buffers 512, 514 which may be used to store information relating to the operands upon which the micro instructions will operate. These buffers are provided to a register file 518 and to a descriptor file 520 during the register stage of the pipeline. The contents of buffers 512, 514 access specific registers in the register file 518 and select the contents of those registers to be output into two temporary registers 522, 524 for use in later clock cycles. Likewise, the buffers are used to access a particular segment register in the descriptor file 520 which is output into a third temporary register 526. Temporary register 526 is used in later cycles to calculate an address for an operand.

When a micro instruction requires access to a memory location, either for Load or Store operations, the address stage calculates the effective address. The address is calculated by providing the contents of registers 522, 524, and 526 as inputs to an ALU circuit 528. The ALU circuit 528 selects appropriate inputs, and stores the effective address in an address register 530. For micro instructions which do not require calculation of an effective address, the contents of registers 522, 524 are forwarded directly to temporary registers 532, 534 for use in later stages.

During the data stage, one of two operations occur. The first operation provides the contents of the registers 532, 534 as inputs to an ALU 536 for operation thereon. The result of the operation is placed in a result register 538. A second operation occurs when the micro instruction is not an ALU operation, but rather a Load or Store operation from or to memory. In this instance, the address in register 530 is provided to a data cache 540 to load data therefrom. If the operation is a Load, the data in the data cache 540 is placed in the result register 538. If the data does not reside in the data cache 540, the cache 540 accesses a memory 542, retrieves the requested data, and places the data in the result register 538.

During the write back stage, the contents of the result register 538 are written into either the data cache 540 (if a memory operation), or the register file 518 (if a register operation), via forward bus 544. Prior to the write back stage, however, the output of the ALU 536 or the data cache 540 are provided on a forward/bypass bus 546 as possible inputs to temporary registers 522, 524, 532, or 534, for use in later processor cycles. Use of the forward/bypass bus 546 allows use of the value in the result register 538 as an input to either the ALU circuit 528, or the ALU 536 on the next processor cycle.

In addition to the buffers and registers called out in FIG. 5, other information relating to micro instructions may be passed from stage to stage along buses 548, 550, 552 and 554. Thus, FIG. 5 shows how an instruction flows through the data path of the pipeline processor 500. At the end of each clock cycle, every value computed during that clock cycle and required on a later clock cycle is written into a storage device, which may be a memory 542, a register file 518, or a temporary register.

To better understand the present invention, discussion will now focus on how an effective address for an operand in memory is calculated within the register and address stages of the processor 500. However, to understand how an effective address is calculated within the processor 500, a brief review of addressing segmented memory is provided. For illustration purposes only the following discussion is based on an x86 memory model.

In x86 systems, "physical" memory space is often divided into a number of "logical" memory regions, termed segments. Segments are then used to control memory access. For example, the operating system can be given its own segments. Application programs can also be given their own segments. Each segment operates as an independent, protected address space. The segments can be completely private to each program, or they can be shared with specific other programs.

Access to segments is controlled by data which describes a segments location, size, the privilege level required to access it, whether the segment is related to the operating system or an application, and whether the segment is present in memory. The data which describes a segment is termed the descriptor.

Descriptors are stored in arrays in memory called descriptor tables. A first descriptor table is defined for the operating system and is called the Global Descriptor Table, or GDT. A plurality of other descriptor tables may be defined for various applications and are called Local Descriptor Table's, or LDTs.

When a program wishes to access a segment within physical memory, the program loads a selector into a segment register within the register file 518. It should be apparent that particular segment registers 219 were shown with reference to FIG. 2. The selector acts as a pointer into the descriptor tables to enable the processor to "read" the desired segment descriptor, and thereby determine the base address of the segment of interest within physical memory. The base address of a particular segment is temporarily stored in the descriptor file 520. By storing the base address associated with a segment in the descriptor file 520, future references to this segment may be made without requiring the processor 500 to retrieve the base address from memory.

Once the base address of a segment is known, a specific location of interest can then be determined by a relative offset from this base location. A micro instruction which references a memory location within a segment is of the form: MOV AX, ES:0100h. For this instruction, the processor locates the base address referenced by the selector in segment register ES, adds the offset 0100h to the base address to obtain a linear memory address, and then moves this address into register AX.

Now, to calculate an effective address for data located in segmented memory, the macro instruction MOV AX,ES:0100h will be used. During a first clock the macro instruction is fetched from the instruction cache 502 and provided to the instruction buffer 504. During a second clock, the macro instruction is decoded by the control unit 505 into a sequence of micro instructions. Whether the micro instructions are register generic, or register specific are not relevant to understanding how the address is calculated, and will not be discussed. The operands associated with the micro instructions include the AX register, the segment register ES, and the offset 100h. The operands AX and 100h may be provided to buffers 512, 514. In addition, the segment register operand ES may be provided to one of the buffers within the instruction register 510.

During a third clock cycle, the contents of buffers 512, 514 are provided to the register stage of the pipeline (assuming zero access time to the control ROM, or register specific micro instructions are provided by the translator 510). The register file accesses register AX and places the contents in buffer 522, for example. It should be appreciated that the contents of AX are not needed by this instruction, and will be ignored by later stages in the pipeline. The immediate operand 100h may be provided directly to buffer 524, for example. And, the descriptor file 520 is accessed at location ES to provide a base address associated therewith to buffer 526.

During a fourth clock cycle, the contents of buffers 524 and 526 are provided to an ALU 528 which adds the contents together. The result of the addition is placed into address buffer 530. In this instance, the value in buffer 530 is the effective address of data in memory that is referenced by the operand ES:0100h.

During a fifth clock cycle, the data cache 540, or the memory 542 is accessed to retrieve the data stored at address ES:0100h, and the data is placed in the result register 538. This result may be stored during the next clock cycle into the register file at location AX.

Now, having provided a discussion of register generic micro instructions, pipeline processing, and effective address calculation within a segmented memory model, an embodiment of the present invention will be discussed which improves the efficiency of fill in of register generic micro instructions when the operands require calculation of an effective address.

Figure 6:
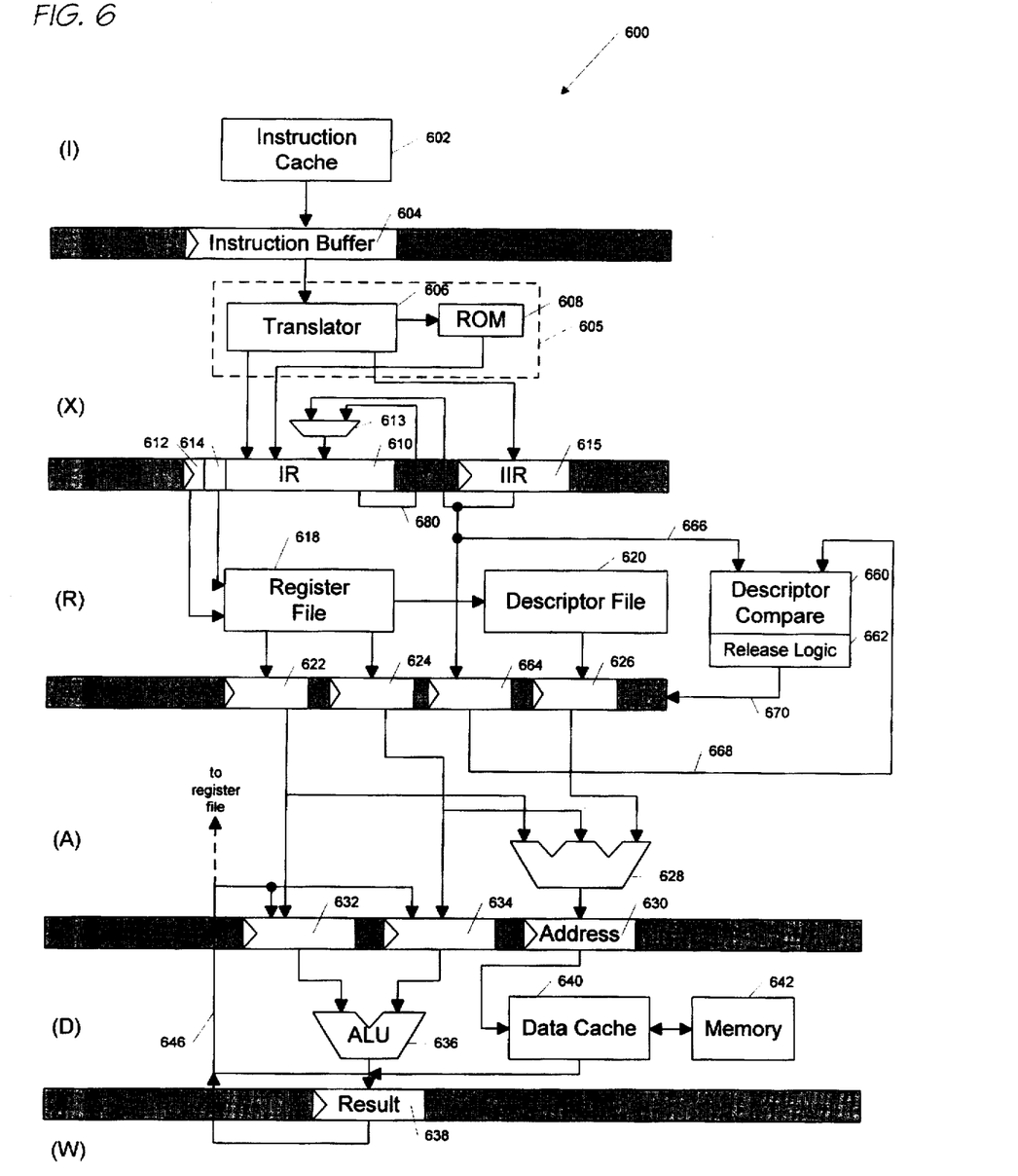
FIG. 6 is a pipeline microprocessor which incorporates a descriptor compare block for eliminating holes in the pipeline created by register generic micro instructions.

Now referring to FIG. 6, a block diagram of a pipeline processor 600 incorporating the present invention is shown. Like numerals refer to like elements with numeral 6 replacing previous numerals 2, 3 and 5 in the hundreds digit. An instruction cache 602 provides macro instructions to an instruction buffer 604. The instruction buffer 604 provides the macro instructions to a control unit 605 containing a translator 606 and a control ROM 608. The outputs of the control unit 605 are provided to an instruction register 610. The instruction register 610 includes operand locations 612, and 614. In addition, the translator 606 provides register specific operands to an instruction indirection register 615 which provides temporary storage for operands. These operands are forwarded to a mux 613 which also has as an input the contents of the instruction register 610. By muxing together the contents of the instruction register 610 and the instruction indirection register 615, register generic micro instructions are supplied with register specific operands.

The operand locations 612, 614 are provided to a register file 618 which provides output to register buffers 622, 624. The register file 618 accesses a descriptor file 620 which provides base register information to an output buffer 626. In addition, the IIR 615 is connected to a descriptor compare block 660 and to operand buffer 664 via bus 666. The operand buffer 664 is also connected to the descriptor compare block 660 via bus 668. The descriptor compare block provides an output release signal via signal line 670.

Figure 7:
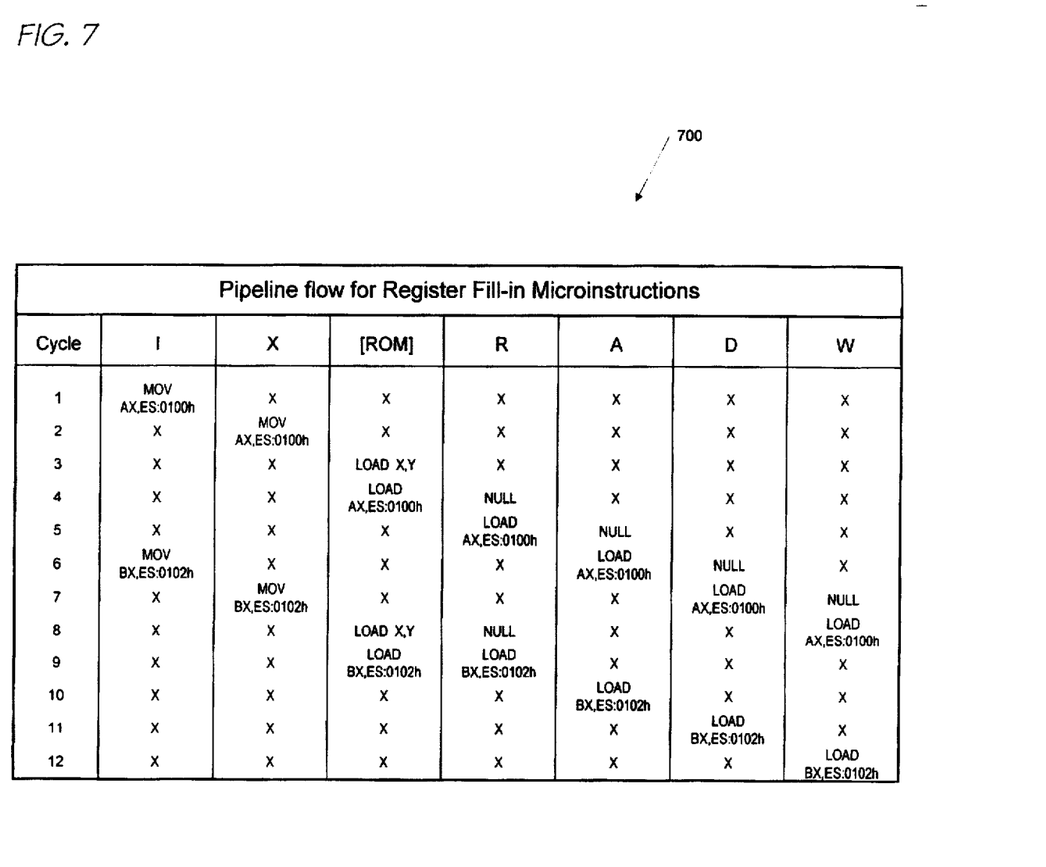
FIG. 7 is a table illustrating micro instruction flow through the pipeline microprocessor of FIG. 6.

In FIG. 7, a pipeline table 700 is provided which shows the progression of two micro instructions through stages in a pipeline processor, similar to that of FIG. 4. Two macro instructions are shown to be fetched from the instruction cache 602, at clock cycles 1 and 6, respectively. The first instruction: MOV AX,ES:0100h, moves the contents of a location in memory to register AX. The second instruction: MOV BX,ES:0102h, moves the contents of a location in memory to register BX. Operation of the descriptor compare block 660 and the operand buffer 664 will be discussed below with reference to FIGS. 6 and 7.

During clock cycle 1, the macro instruction MOV AX,ES:0100h is fetched from the instruction cache 602 and provided to the instruction buffer 604.

During clock cycle 2, the translator 606 within the control unit 605 reads the contents of the instruction buffer, and addresses the control ROM 608 to produce an associated micro instruction which performs the function of the MOV. Also, register specific operands associated with the macro instruction are provided to the IIR 615.

During clock cycle 3, the control ROM 608 produces a register generic micro instruction LOAD X,Y which is provided to the instruction register 610.

During clock cycle 4, a hole in the pipeline occurs because the specific operands for the LOAD micro instruction must be inserted into the instruction register 610. The IIR 615 provides the operands AX, 100h and ES to the instruction register 610, via mux 613, at locations 612 and 614.

During clock cycle 5, the register file 618 uses the operands in locations 612, 614 to access the AX register. As discussed above, the contents of register AX are not required by the present micro instruction, and will therefore be ignored by later stages in the pipeline. In addition, the operand ES is provided to the descriptor file 620 for retrieval of the base address associated with the selector stored in segment register ES. While not shown, it should be understood by one skilled in the art that the desired segment pointed to by segment register ES has already been loaded, and the base address resides in the descriptor file 620. Furthermore, the operand ES is latched into operand buffer 664.

During clock cycle 6, the contents of buffer 624 (0100h) and buffer 626 (the base address associated with the segment stored in ES), are provided to the address stage of the pipeline. The address stage uses these values to calculate the effective address referred to by ES:0100h, and stores the address in the address buffer 630.

During clock cycle 7, the effective address in address buffer 630 is used to retrieve the data from either the data cache 640 or the memory 642. The data is stored in the result register 638.

During clock cycle 8, the data is written into the register file 618 at location AX.

At this point, the pipeline flow is similar to what has been previously discussed. It should be noted that utilizing register generic instructions where an operand required calculation of an effective address, produced a hole in the pipeline. What will now be shown is how an embodiment of the present invention is used to eliminate future holes resulting from register generic fill in of operands.

Also during clock cycle 6, a second macro instruction MOV BX,ES:0102h is fetched from the instruction cache 602 and placed into the instruction buffer 604.

During clock cycle 7, the translator 606 within the control unit 605 retrieves the macro instruction and addresses the control ROM 608 to produce the associated micro instruction which performs the function of the MOV. The translator 606 also provides the operands BX, ES to the IIR 615. In one embodiment of the present invention, immediate, and displacement operands are provided to other buffers between the translator and registers stages of the processor. Thus, the operand 0102h is provided to an immediate buffer (not shown) for use in later stages of the pipeline.

During clock cycle 8, the control ROM 608 produces a register generic micro instruction LOAD X,Y which is provided to the instruction register 610. At this point, a hole in the pipeline exists because the specific operands for the LOAD micro instruction have not been provided to the instruction register 610

At the beginning of clock cycle 9, the control ROM 608 Location 614 does not yet contain the operand ES. Location 612 does not yet contain the operand AX. However, since the operand 0102h is an immediate operand, i.e., an operand that does not need to be retrieved from memory or registers, it was provided by the control unit 605 during clock cycle 7, along with the register specific operands. Therefore, the immediate operand exists at the beginning of clock cycle 9.

In addition, the contents of operand buffer 664 still retains the last accessed segment register, which in this instance is ES. And, the base address of the last accessed segment still resides in the base address buffer 626. So, at the beginning of clock cycle 9, the immediate operand 102h is available to the buffer 624. And, the operands AX and ES are specified within the IIR 615. Thus, during clock cycle 9, the contents of the IIR 615 are inserted, via mux 613, into the register generic micro instruction within the instruction register 610.

Without the present invention, the micro instruction would simply proceed through the pipeline as before with reference to clock cycles 1–6. However, at the beginning of clock cycle 9, the base address is already stored in address buffer 626, and the offset 0102h already exists in the immediate operand buffer (not shown). If the processor 600 was aware that the base address residing in buffer 626 was correct for this micro instruction, it could be used during clock cycle 9, rather than having to retrieve the base address from the descriptor file 620.

So, at the beginning of clock cycle 9, the contents in IIR 615 (in this case ES) exist at the input to the descriptor compare block 660, via bus 666, and the last used segment register (in this case ES) also exists at the input of the descriptor compare block 660, via bus 668 connected to operand buffer 664. When the contents in IIR 615 and buffer 664 are the same, the descriptor compare block 660 generates, via the release logic 662, a release signal 670 which allows the contents of buffers 624 (0102h) and the contents of address buffer 626 (the base address for ES), to proceed to the next stage in the pipeline.

During clock cycle 10, the contents of buffer 624 and 626 are used by the address stage of the pipeline to calculate the effective address specified by the operands ES:0102h. Note that the register stage of the pipeline, for this micro instruction, has effectively been bypassed.

The effective address calculated during clock cycle 10 is then used during clock cycle 11 to retrieve the data at that address from either the data cache 640 or the memory 642 and place the data in the result register 638.

During clock cycle 12, the retrieved data is then written into the BX register.

Thus, the register generic micro instruction provided by the control ROM 608 created a hole in the pipeline during the first execution of a macro instruction having an operand referenced by segment register ES. However, the second time the control ROM 608 provided a register generic micro instruction which had a macro instruction having an operand referenced by segment register ES, the descriptor compare block 660 was able to take advantage of its previous knowledge of the base address associated with ES, and the immediate operand, and release these values to the address stage of the pipeline without having to retrieve the base address for ES from the descriptor file 620. The descriptor compare block 660 effectively removes the hole created by register generic micro instructions when the segment referenced by an operand is the same as the last segment referenced by previous micro instructions.

It should be understood that the operands which are compared in the descriptor compare block 660 relate to the contents of the IIR 615, and the values latched in buffers 622–626. As should be appreciated by one skilled in the art, the operand values may be associated with immediate operands, displacement operands, register operands, or descriptors. By comparing operands of past micro instructions, to operands associated with a present micro instruction, the register stage of the pipeline may often be ignored, thereby eliminating holes associated with register generic micro instructions.

Although the present invention has been described in considerable detail with reference to certain preferred versions thereof, other versions are possible. For example, the illustration above discussed a specific example for calculating an effective address for an operand which utilized a segmented memory model. And, the example provided utilized a specific segment register and an immediate operand to calculate the effective address. It should be clear to one skilled in the art that other addressing schemes may be used by without departing from the spirit of the present invention. For example, the descriptor compare block may track a number of last used operands which reference the register file. By monitoring whether changes are made to these registers, and latching the last used contents of these registers, the compare block can release these contents to later stages in the pipeline without having to re access the register file. This is true whether the contents of the register file are used to calculate an address in the address stage, or whether they are used in the data stage as operands input to the ALU. What should be clear is that by tracking the last used contents of specific registers, holes in a pipeline created by register generic micro instructions may be eliminated.

We claim:

1. A pipeline processing system, for executing macro instructions, the system comprising:

memory, for storing addressable data;

an instruction cache, for storing said macro instructions;

a control unit, connected to said instruction cache, for retrieving said macro instructions from said instruction cache, and for translating each of said macro instructions into a plurality of associated micro instructions, said plurality of associated micro instructions having operands, said control unit comprising:

a control ROM, for storing a plurality of register generic micro instruction sequences; and a translator, connected to said control ROM, for selecting ones of said plurality of register generic micro instruction sequences, and for converting said ones of said plurality of register generic micro instruction sequences into said plurality of associated micro instructions for said each of said plurality of macro instructions;

an instruction register, connected to said translator, for storing said plurality of associated micro instructions, for execution in later stages in said pipeline processor system;

a register file, connected to said instruction register, addressable by said operands, for temporarily storing register data which may be operated upon by said plurality of associated micro instructions; and descriptor compare logic, connected to said instruction register, and to said register file, for latching a first operand, associated with a first micro instruction, and for comparing said first operand with a second operand, which is provided by said translator, wherein said descriptor compare logic causes the pipeline processing system to halt for at least one clock cycle when said first operand and said second operand are not the same.

2. The pipeline processing system as recited in claim 1 wherein said pipeline processing system is a microprocessor.

3. The pipeline processing system as recited in claim 2 wherein said instruction cache is a memory within said microprocessor for storing said macro instructions.

4. The pipeline processing system as recited in claim 1 wherein said instruction cache is a memory for storing macro instructions.

5. The pipeline processing system as recited in claim 4 wherein said memory is dynamic read only memory.

6. The pipeline processing system as recited in claim 1 wherein said control ROM may also store register specific micro instructions.

7. The pipeline processing system as recited in claim 1 wherein said register generic micro instruction sequences comprise machine level instruction primitives which do not have operands that refer to specific registers within said register file.

8. The pipeline processing system as recited in claim 1 wherein said ones of said plurality of register generic micro instruction sequences are selected by said translator to correspond to said each of said macro instructions.

9. The pipeline processing system as recited in claim 1 wherein said translator converts said ones of said plurality of register generic micro instruction sequences into said plurality of associated micro instructions for said each of said plurality of macro instructions by specifying particular registers for said plurality of register generic micro instruction sequences.

10. The pipeline processing system as recited in claim 9 wherein said specified particular registers refer to registers within said register file which temporarily store said register data which may be operated upon by said plurality of associate micro instructions.

11. The pipeline processing system as recited in claim 1 wherein said instruction register is a temporary register used to hold said associated micro instructions.

12. The pipeline processing system as recited in claim 1 wherein said register file comprises:

data registers, for storing said register data which may be operated upon by said plurality of associated micro instructions; and segment registers, which provide address information pointing to said addressable data stored in said memory.

13. The pipeline processing system as recited in claim 12 wherein said segment registers comprise:

selector registers, for storing indices to a plurality of base address locations; and descriptor registers, associated with said selector registers, for storing said base address locations.

14. The pipeline processing system as recited in claim 13 wherein said operands reference said indices stored in said selector registers, which point to said descriptor registers.

15. The pipeline processing system as recited in claim 14 wherein when said operands reference said indices, said operands use said base address locations in said descriptor registers to calculate effective addresses in said memory for said addressable data.

16. The pipeline processing system as recited in claim 13 wherein said base address locations are used by later stages in the pipeline processing system to calculate effective addresses for said addressable data in said memory.

17. The pipeline processing system as recited in claim 14 wherein when said first operand references an indicium stored in one of said selector registers, and said second operand references said indicium stored in said one of said selector registers, said descriptor compare logic does not halt said pipeline processing system.

18. The pipeline processing system as recited in claim 17 wherein said first operand utilizes a first base address to calculate a first effective address for said first operand, and said second operand also utilizes said first base address to calculate a second effective address for said second operand.

19. The pipeline processing system as recited in claim 18 wherein said first base address is used by later stages in said pipeline processing system to calculate said second effective address for said second operand.

20. The pipeline processing system as recited in claim 19 wherein said first base address is provided to said later stages in said pipeline processing system, without any clock delays, to calculate said second effective address for said second operand.

21. A pipeline microprocessor, within a computer system having a memory for storing addressable data and an instruction cache for storing macro instructions, the pipeline microprocessor having multiple pipeline stages including a register stage, for executing micro instructions, the pipeline microprocessor comprising:

a control unit, connected to the instruction cache, for retrieving said macro instructions from the instruction cache, and for translating each of said macro instructions into a plurality of micro instructions which are associated therewith, said plurality of associated micro instructions having operands, said operands specifying addressable data upon which said associated micro instructions operate, said control unit comprising:

a control ROM, for storing a plurality of micro instruction sequences which do not specify addressable data upon which said plurality of micro instruction sequences operate; and a translator, connected to said control ROM, for selecting ones of said plurality of micro instruction sequences which are associated with said each of said macro instructions, and for providing to said ones of said plurality of micro instruction sequences, said operands which specify addressable data upon which said ones of said plurality of micro instruction sequences operate;

an instruction register, connected to said control unit, for storing said plurality of associated micro instructions, and for providing said plurality of associated micro instructions to later stages in said pipeline microprocessor;

register file, connected to said instruction register, said register file comprising:

addressable data registers, for storing data upon which said plurality of micro instruction sequences operate; and segment registers, for storing base addresses of segments in the memory which contain data upon which said plurality of micro instruction sequences operate;

wherein said operands indicate either of said addressable data registers, or said segment registers to specify said addressable data upon which said associated micro instructions operate; and descriptor compare logic, connected to said instruction register, and to said register file, for latching a first operand, associated with a first micro instruction, which indicates one of said segment registers which specifies addressable data by providing a first base address, and for comparing said first operand with a second operand which is associated with a second micro instruction;

whereby when said second operand also indicates said one of said segment registers which specifies addressable data by providing said first base address, said descriptor logic releases the register stage in said pipeline processor thereby providing said first base address to later stages in the pipeline.

22. The pipeline microprocessor as recited in claim 21 wherein said operands specify either addressable data registers which contain said data upon which said plurality of associated micro instructions operate; segment registers, which store said base addresses of segments in the memory which contain said data upon which said plurality of associated micro instructions operate; or immediate data, upon which said plurality of associated micro instructions operate.

23. The pipeline microprocessor as recited in claim 21 wherein said control ROM is read only memory.

24. The pipeline microprocessor as recited in claim 21 wherein said plurality of micro instruction sequences which do not specify addressable data comprise machine level instruction primitives which do not have operands that refer to specific said addressable data registers or said segment registers within said register file.

25. The pipeline microprocessor as recited in claim 21 wherein said translator provides an address to said control ROM which references said select ones of said plurality of micro instruction sequences appropriate for each of said macro instructions.

26. The pipeline microprocessor as recited in claim 25 wherein said select ones of said plurality of micro instruction sequences are provided by said control unit, one at a time, to said instruction register.

27. The pipeline microprocessor as recited in claim 26 wherein said select ones of said plurality of micro instructions sequences are first provided to said instruction register by said control ROM without specifying addressable data upon which said plurality of micro instruction sequences operate.

28. The pipeline microprocessor as recited in claim 27 wherein said translator provides to said instruction register said operands which specify addressable data upon which said ones of said plurality of micro instruction sequences operate, for each of said plurality of micro instruction sequences which do not specify addressable data.

29. The pipeline microprocessor as recited in claim 21 wherein said instruction register, if it contains one of said plurality of associated micro instructions, and if said one of said plurality of associated micro instructions contains said operands which specify addressable data upon which said ones of said plurality of micro instruction sequences operate, said instruction register will provide said one of said plurality of associated micro instructions to a later stage in said pipeline.

30. The pipeline microprocessor as recited in claim 21 wherein said instruction register, if it contains one of said plurality of associated micro instructions, and if said one of said plurality of associated micro instructions does not contain said operands which specify addressable data upon which said ones of said plurality of micro instruction sequences operate, said instruction register will not provide said one of said plurality of associated micro instructions to a later stage in said pipeline, causing said pipeline to stall for at least one clock cycle.

31. The pipeline microprocessor as recited in claim 21 wherein said segment registers comprise:

selector registers, which are addressable by said operands, and which contain selectors which point to descriptors; and descriptor registers, associated with said selector registers, which contain said descriptors.

32. The pipeline microprocessor as recited in claim 31 wherein said descriptors contain said base addresses of segments in the memory which contain data upon which said plurality of micro instruction sequences operate.

33. The pipeline microprocessor as recited in claim 21 wherein said descriptor compare logic comprises:

a register latch, connected to said instruction register, for latching said operands;

a descriptor compare circuit, connected to said instruction register, and to said register latch, for comparing a first operand latched by said register latch, to a second operand within said instruction register; and a release cycle signal, connected to said descriptor compare circuit, for indicating when said first operand and said second operand are the same.

34. The pipeline microprocessor as recited in claim 33 wherein when said release cycle signal indicates that said first operand and said second operand are the same, said register stage of the pipeline releases a last used base address.

35. The pipeline microprocessor as recited in claim 34 wherein said last used base address is an address used to calculate an effective address of a memory location within the memory, pointed to by said first operand.

36. A method for improving the execution speed of a pipeline processor having multiple stages which execute micro instructions that operate on data, the data specified by operands within the micro instructions, wherein the micro instructions are stored within a control ROM with register generic operands, provided by the control ROM to an instruction register, and later filled in with register specific operands by a translator, the method comprising the steps of:

loading a first operand associated with a first micro instruction into a latch;

comparing a second operand associated with a second micro instruction with the latched first operand;

and if the second operand has the same value as the first operand, generating a pipeline release signal to allow the stages of the pipeline processor to continue.

37. The method as recited in claim 36 wherein said first and second operands are used by the pipeline processor to determine addresses within a memory where data is stored.

38. The method as recited in claim 37 wherein said data is operated upon by said first and second micro instructions.

39. The method as recited in claim 38 wherein when said second operand has the same value as the first operand, a descriptor base address associated with said first operand is used to calculate an address in said memory for said data associated with said second operand.

40. The method as recited in claim 39 wherein when said first and said second operands do not have the same value, said step of comparing does not allow the stages of the pipeline processor to continue.

41. The method as recited in claim 40 wherein the pipeline processor must calculate an effective address using said second operand to obtain data to be operated upon by said second micro instruction.

42. The method as recited in claim 41 wherein said calculation of said effective address using said second operand requires a stall in the pipeline processor.

43. A pipeline microprocessor, having a plurality of pipeline stages, allowing simultaneous execution of a plurality of micro instructions, said pipeline microprocessor comprising:

an instruction cache, for storing said macro instructions;

a control unit, coupled to said instruction cache, for retrieving said macro instructions from said instruction cache, and for translating each of said macro instructions into a plurality of associated micro instructions, said micro instructions having operands;

a register file, coupled to said control unit, addressable by said operands, for providing data stored in registers addressed by said operands; and comparison logic, coupled to said control unit, and to said register file, for latching a first operand, associated with a first micro instruction in a first stage of the microprocessor, for comparing said first operand with a second operand, associated with a second micro instruction in a second stage of the microprocessor, and for generating a release signal to the microprocessor when said first operand and said second operand are the same;

wherein said release signal causes the second micro instruction to skip a processing stage within the microprocessor.

\* \* \* \* \*